US007966103B2

(12) United States Patent
Jørgensen et al.

(10) Patent No.: US 7,966,103 B2
(45) Date of Patent: Jun. 21, 2011

(54) APPARATUS AND METHOD FOR OPERATING A WIND TURBINE UNDER LOW UTILITY GRID VOLTAGE CONDITIONS

(75) Inventors: Allan Holm Jørgensen, Aalborg (DK); Lars Helle, Suldrup (DK); Leonard Schaier, Port Washington, NY (US)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/809,379

(22) PCT Filed: Dec. 17, 2008

(86) PCT No.: PCT/EP2008/067696
§ 371 (c)(1),
(2), (4) Date: Oct. 28, 2010

(87) PCT Pub. No.: WO2009/083447
PCT Pub. Date: Jul. 9, 2009

(65) Prior Publication Data
US 2011/0049903 A1    Mar. 3, 2011

Related U.S. Application Data

(60) Provisional application No. 61/009,594, filed on Dec. 28, 2007.

(30) Foreign Application Priority Data

Feb. 28, 2008   (DK) .................................. 2008 00289

(51) Int. Cl.
*F03D 9/00* (2006.01)
*H02P 9/00* (2006.01)

(52) U.S. Cl. ........................................ 700/297; 290/44
(58) Field of Classification Search .................. 700/287; 290/44
See application file for complete search history.

(56) References Cited

U.S. PATENT DOCUMENTS

| 4,031,407 | A | * | 6/1977 | Reed ............................. 307/87 |
| 4,283,634 | A | * | 8/1981 | Yannone et al. ............ 290/40 R |
| 4,536,126 | A | * | 8/1985 | Reuther ...................... 290/40 R |
| 5,083,039 | A |   | 1/1992 | Richardson et al. |
| 7,423,412 | B2 | * | 9/2008 | Weng et al. ..................... 322/20 |
| 7,432,686 | B2 | * | 10/2008 | Erdman et al. ................. 322/44 |

(Continued)

FOREIGN PATENT DOCUMENTS

EP           1561946 A2    8/2005

(Continued)

OTHER PUBLICATIONS

European Patent Office, International Search Report issued in related International Application No. PCT/EP2008/067696 dated Jun. 23, 2009.
The International Bureau of WIPO, International Preliminary Report on Patentability issued in related International application No. PCT/EP2008/067696 dated Jun. 19, 2010.

*Primary Examiner* — Joseph Waks
(74) *Attorney, Agent, or Firm* — Wood, Herron & Evans, LLP (57) ABSTRACT

A wind turbine and an associated method for controlling the output current from the wind turbine to an electric power grid and including the wind turbine and the method for controlling the current under conditions of grid voltage variations due to changing grid conditions as in the case when the wind turbine experiences and recovers from a fault.

2 Claims, 6 Drawing Sheets

U.S. PATENT DOCUMENTS

| | | | |
|---|---|---|---|
| 7,476,987 B2 * | 1/2009 | Chang | 290/55 |
| 7,728,452 B2 * | 6/2010 | Arinaga et al. | 290/44 |
| 7,880,321 B2 * | 2/2011 | Arinaga et al. | 290/44 |
| 2009/0146500 A1 * | 6/2009 | Jones et al. | 307/82 |
| 2009/0206606 A1 * | 8/2009 | Jorgensen et al. | 290/44 |
| 2010/0025995 A1 * | 2/2010 | Lang et al. | 290/44 |
| 2010/0072751 A1 * | 3/2010 | Andersen et al. | 290/44 |

FOREIGN PATENT DOCUMENTS

| | | |
|---|---|---|
| JP | 2007239599 A | 9/2007 |
| WO | 2005031160 A2 | 4/2005 |
| WO | 2007140466 A2 | 12/2007 |

* cited by examiner

APPARATUS AND METHOD FOR OPERATING A WIND TURBINE UNDER LOW UTILITY GRID VOLTAGE CONDITIONS

FIELD OF THE INVENTION

The present invention relates to controlling the output current from a wind turbine to an electric power grid, and, more particularly, to an apparatus and method for controlling the current under conditions of grid voltage variations due to changing grid conditions as in the case for example when a wind turbine experiences and recovers from a fault.

BACKGROUND OF THE INVENTION

A wind turbine is an energy converting device that converts kinetic energy in the wind into electrical energy for use by customers connected to a utility power grid. This type of energy conversion typically involves using wind to turn turbine blades that, in turn, rotate the rotor of an alternating current (AC) electrical generator, either directly or through a gearbox.

The primary electrical output of an AC generator is from its stator. The output from the stator can be directly connected to the grid or pass through a power converter. One common generator of prior art systems is the doubly-fed induction generator (DFIG) where the output from the stator is controlled by the current in its rotor. The stator in such a system can be directly connected to the grid because the stator voltage and frequency, being controlled by the rotor, can be forced to match the grid voltage and frequency.

A non-DFIG generator such as a synchronous generator or cage induction generator machine can also be used as the electrical generator in a wind turbine system that provides controlled real and reactive power. When these machine types are used in a variable speed configuration a full converter is utilized between the stator output and a utility grid since the output frequency of the generator is not controlled. A full converter rectifies the AC output of the stator to DC, and then inverts the DC back to AC at levels that match the grid voltage and frequency.

The electrical power available from a wind turbine and supplied to a utility grid is a function of the speed of the wind, the characteristics of the wind turbine rotor, efficiency of the wind turbine and associated equipment, losses in the grid and the characteristics of the distribution system and loads connected thereto. Because the wind speed and loads fluctuate, voltage levels in the grid can vary. Likewise since most electric power transmission components have a significant reactive component, voltages in the grid are also a function of the reactive characteristics of loads and components connected to the grid.

To prevent damage to equipment, grid voltage must be held within certain tolerances and when these limits are exceeded, action must be taken. For variations on the order of nominal voltages +/−5% or so, suppliers or absorbers of variable amounts of reactive power are used to compensate for voltage changes due to the reactive nature of the grid.

When a shorting type grid fault occurs, grid voltages can fall far below normal level, which could potentially damage power generating equipment due to, among other things, excess currents and mechanical stresses. As is well recognized, power equals voltage times current. Therefore, if there is a fall in voltage and the power is not reduced, the current will rise dramatically.

To protect against damage, if the fall in voltage exists for a significant period of time, circuit breakers or fuse like devices isolate that portion of the grid containing the fault from the power source. The isolation of the portion of the grid containing the fault is referred to as "clearing."

Wind turbines and/or wind parks using constant power controllers (both real and reactive power) are particularly susceptible to damage by excess currents. If the power control loop can not respond quickly enough, output current will spike up to maintain a fixed power level and compensate for a falling voltage. To protect against high currents, many prior art systems limit output current during a fault current to a maximum preset value, thus minimizing potential damage due to high current.

The present invention uses a control concept commonly described as a constant current or controlled current source for protection. As used in this specification, the terms "constant current" or "controlled current" are to be interpreted to mean that the constant or controlled current is related to a command or reference by a substantially fixed proportionality factor and substantially independent of the voltage into which the current is fed.

The power output of wind turbine operating as a constant or controlled current source varies in direct proportion to the grid voltage. Therefore, voltage during a fault goes through two phases of varying output power. When the voltage drops in response to the fault, the output power is at a minimum, having gone through a substantially steep transition from full power to a much lower level. After the fault is cleared, the grid voltage rises, which demands an increasing amount of output power from the wind turbine(s) until the power is restored to pre-fault levels.

In the past it was more common to protect the turbines affected by the fault by disconnecting them from the grid. However, as the number of wind turbines being used to generate electricity grew, increasing their relative contribution to the overall power of the grid, emerging practice is to require that wind turbines stay connected to help support the grid both during a fault and as the grid recovers from the fault, that is provide, as needed, either reactive or real current.

The support requirement generally relates to counteracting the effect of a fault by trying to raise system voltages and to minimize the amount of time required to place a wind turbine back on line generating power. Moreover, although it seems counterintuitive, it is advantageous for affected wind turbines to continue to provide output current at substantially the same magnitude as that which was present prior to the fault and not reduce it. A normative output current is better able to actuate the protective devices and therefore potentially shorten the time to isolate a fault.

An additional motivation for keeping a wind turbine connected and providing power during a fault is to reduce the time needed to get a disconnected turbine back on line after the fault is cleared. If the wind turbine rotor could be kept running at or near the pre-fault speed, the time to get fully back on line can be greatly shortened. Conversely, if the load is reduced, as it is in a fault condition, the blades of the turbine would be caused to accelerate rapidly, and unless some steps are taken to address the problem, damage will occur.

Grid codes around the world require different behavior during a low voltage grid fault. Some grid codes requires full reactive current and as much as possible active current during the grid disturbance. Other grid codes prioritize the active current. Although it would be desirable to be able to maximize real and reactive current at the same time, component heating, whether it is the rotor of a DFIG or the current carrying elements of a partial or full converter, is a function of both the real and reactive components of the current being carried. Therefore if it is desired to maximize real current, then the reactive current component must be minimized. Likewise if reactive current were to be maximized, then the real current component of the total must be minimized.

The present invention is directed to solving the aforementioned problem of being able to maximize both the reactive and real current components available from a wind turbine or grouping of wind turbines, by providing a separate reactive power supply to handle reactive current requirements during a fault and requiring the wind turbines themselves to maximize real power.

As is known to those skilled in the art, a variable speed wind turbine extracts the maximum it can from the wind when the blade tip speed to wind speed ratio is a constant at or near the particular design value for the particular wind turbine design. However, because of generator speed restrictions, it is not possible to operate a wind turbine at its optimum blade tip-wind speed ratio over the whole wind speed range. Stated differently, as the wind speed increases, the rotational speed of the generator increases and brings it closer to the upper speed limit of the rotor and generator.

In the mid- to upper-speed range, which is the range at where the wind turbine is most efficient, the blade tip to wind speed ratio is held constant by balancing the power output from the system to that available from the wind. That is, the power commanded by the wind turbine is derived from knowledge of the wind speed and is set to that value.

At higher wind speeds the wind turbine cannot be allowed to operate at its optimum blade tip to wind speed ratio, known as the tip speed ratio (typically in the range of about 6 to 10) because to keep the ratio constant would require a rotational speed for the generator that would exceed its limits. Therefore when wind speed increases to its nominal speed, and further increases could drive the generator into an unsafe speed range, a generator speed reference is clamped to the nominal speed point. If wind speed increases further, the commanded power output is limited to a fixed value and blade pitch is varied to keep the power taken from the wind equal to the power necessary to keep the wind turbine rotor, and hence the generator, at the generator's nominal speed. Blade pitch control is used because, even though there is more power available to be extracted from the wind at high wind speeds, the wind turbine rotor is made less efficient at extracting the extra power.

In the case of higher wind speed (as in the case of the lower speed range as well), there must be a balance between power captured by a rotor system and the power outputted from the turbine plus losses in the various wind turbine systems. However a difference between operation in these ranges is that in the optimum speed range, the blade is set to extract as much power is available, while in the higher speed range the blade pitch is set to take just enough power to meet the value commanded for full power which is less than what is actually available in the wind.

When either balance is disturbed, as in the case of a sudden low voltage fault, prior art systems have often used a rapid blade pitch change to a no power position followed by shutdown to prevent equipment damage due to over currents and overspeed conditions.

In general, the power captured by a wind turbine rotor blade system is derived from:

$$P_{el} = \frac{\eta \rho}{2} \pi R^2 c_p v^3, \quad [\text{Eq. 1}]$$

where $\eta$ is an efficiency factor, dependent upon the efficiency of the generator, gearbox, etc. and $\rho$ is air density, which is about 1.225 kg/m$^3$ at sea level; R is rotor radius in meters, $c_p$ is the fraction of power extracted from the wind, and v is the wind velocity in meters/second.

Figure 1:
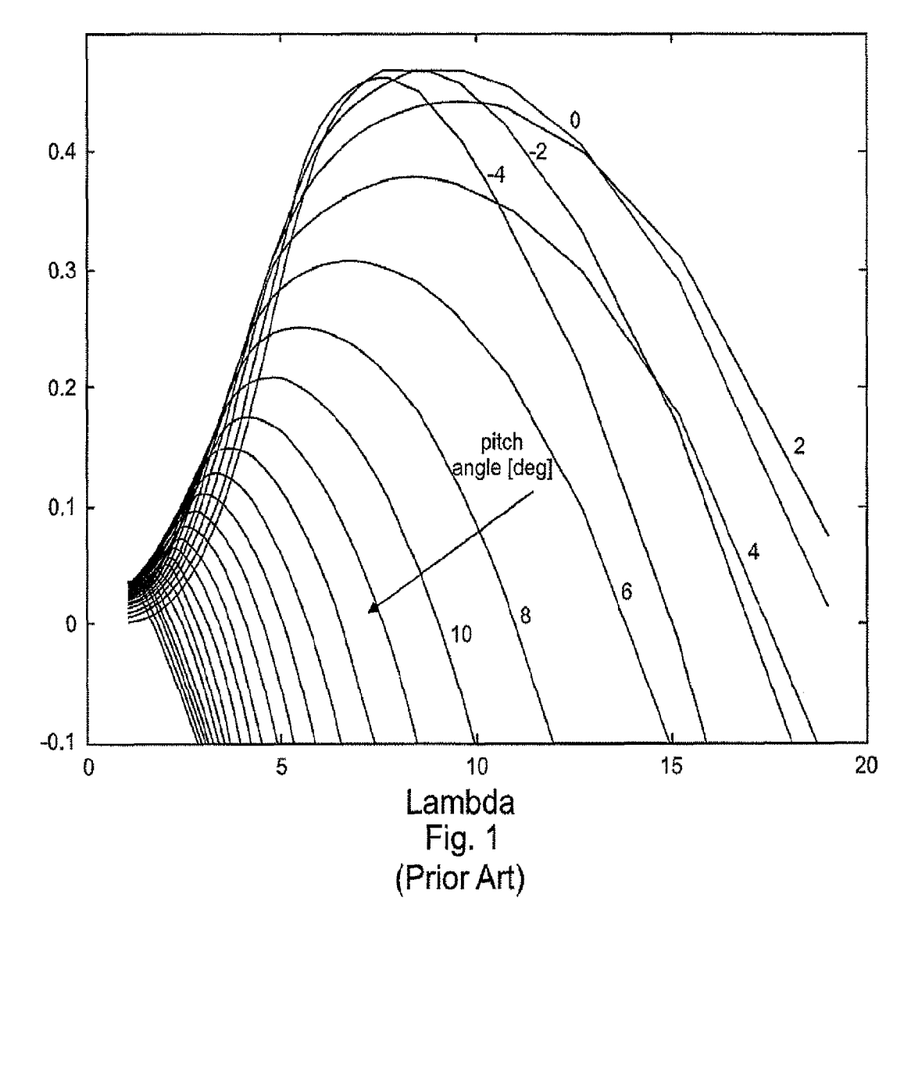
FIG. 1 is a graph illustrating power output of a prior art wind turbine as a function of blade tip to wind speed ratio (lambda) and wind speed.

A prior art set of $c_p$ curves as a function of blade pitch angles and blade tip to wind speed ratio (lambda) are shown in FIG. 1. As illustrated in FIG. 1, each different blade pitch angle curve has a different blade tip to wind speed ratio at which $c_p$ is a maximum. A plot of the blade pitch angle versus blade tip to wind speed ratio at each of the maximum $c_p$ points therefore yields the blade pitch angle that will allow extraction of maximum available power at each lambda. As one skilled in the art would recognize from the example in FIG. 1, the maximum power in the wind will be extracted if the tip to wind speed ratio is in the ratio of about 6 to 10.

For a given wind turbine design, Eq. 1 calculates the actual electrical output of a wind turbine when both $c_p$, which is a function of blade pitch angle, and v are known.

Likewise, the same constituents of Eq. 1 can be used for calculating $c_p$ rather than $P_{el}$, as follows:

$$c_p = \frac{2P_{el}}{\eta \rho \pi R^2 v^3}, \quad [\text{Eq. 2}]$$

Eq. 2 therefore gives the power coefficient value needed to extract from a wind at velocity v, an electrical value of $P_{el}$, as a function of lambda.

The present invention utilizes the information in FIG. 1, Eq. 1 and Eq. 2 to determine a blade pitch angle that will extract from the wind the power imposed on a wind turbine during and after a fault and therefore hold generator rotor speed substantially constant during and after a fault.

One additional benefit of the present invention is that it improves recovery characteristics by providing controlled current values while tolerating the varying voltages that result from a fault. This compares favorably to the prior art systems, where the power delivered to the load during a fault is a transient function of changing voltage and current.

DESCRIPTION OF THE INVENTION

The present invention protects a wind turbine during a low voltage fault and provides grid support by supplying negative current feedback to force the power generating equipment to operate as a constant/controlled current source that is substantially independent of grid voltage, protects against rotor overspeed by changing blade pitch angle to match the actual output power during the fault and recovery from the fault, and provides maximum reactive and real current by, in a preferred embodiment, separating the functionality required to provide real and reactive currents.

Rotor speed is controlled during and after the fault by controlling blade pitch angle so that the power provided by the wind and absorbed by the rotor is substantially matched to the power output of the wind turbine. In its preferred embodiment, the present invention accomplishes substantially constant speed by using one or more look up tables that relate blade pitch to power output as a function of lambda. In an alternate embodiment, mathematical expressions are used to find blade pitch angles.

As noted, grid codes establish varying requirements for wind turbines during a low voltage grid fault. The present invention can satisfy all of these grid codes, through its ability to deliver full reactive current and/or full active current or any subset thereof to address the fault condition. This, in turn, permits a uniform worldwide turbine design, substantially reducing costs, particularly during periods such as presently where there is a significant demand for wind turbines.

BRIEF DESCRIPTION OF THE DRAWINGS

Referring to the figures in which like numbers refer to like elements.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

Figure 3:
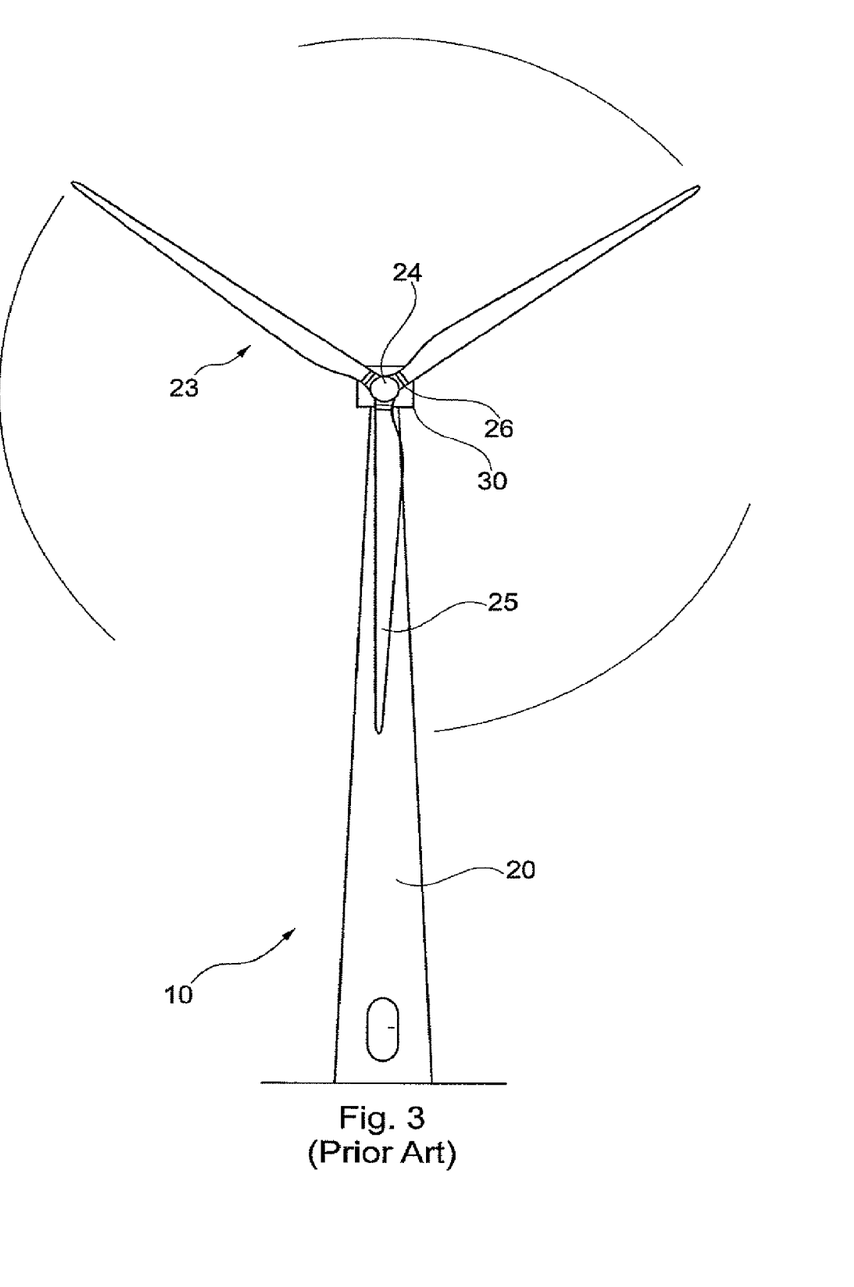
FIG. 3 is a schematic illustration of the major elements of a prior art wind turbine

As graphically shown in FIG. 3, a Wind Turbine 10 is supported on a Tower 20 and a Wind Turbine Nacelle 30 is positioned on top of the tower.

The Wind Turbine Rotor 23 illustrated has three Wind Turbine Blades 25 connected to the Hub 24 through Pitch Mechanisms 26. Each Pitch Mechanism 26 includes a blade bearing and pitch actuating means which allows the blade to pitch. The pitch process is controlled by a pitch controller. Details of the blade bearings, pitch actuating means and pitch controller (not shown) are well known in the art.

Figure 4:
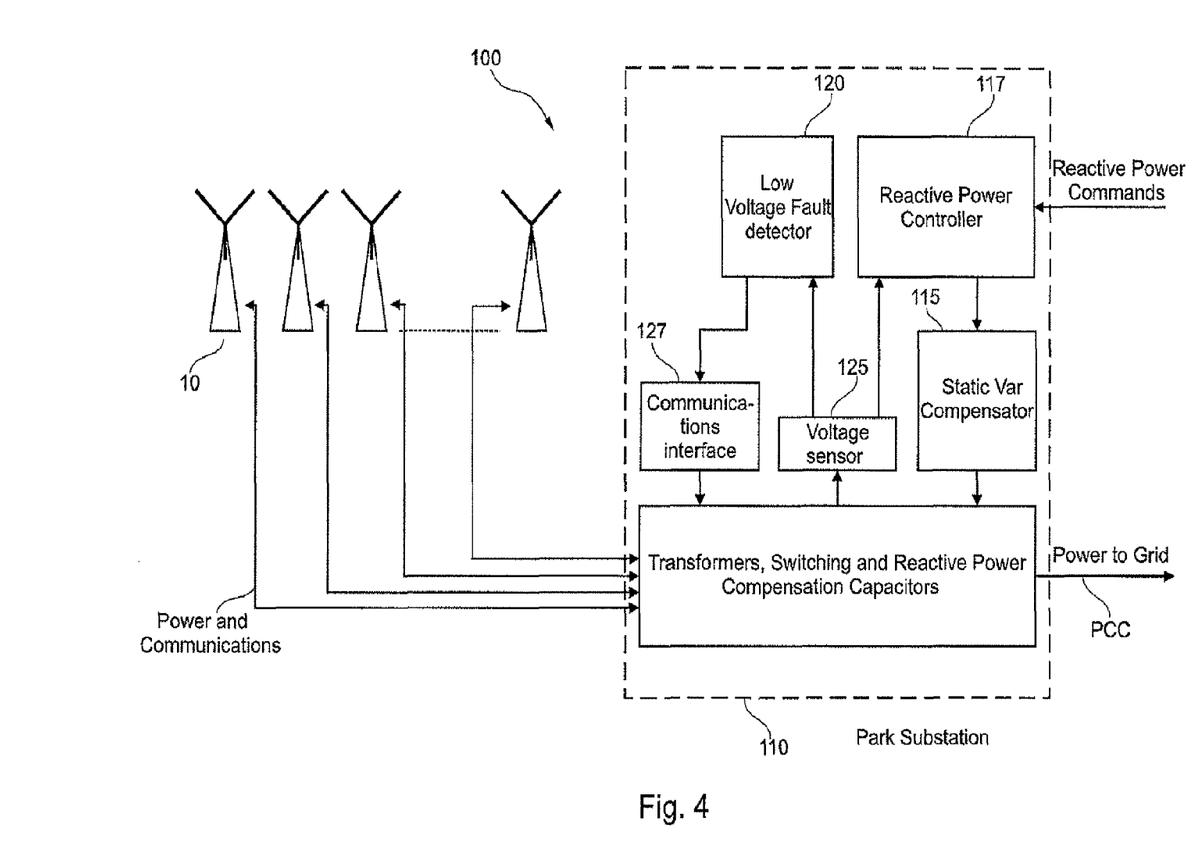
FIG. 4 is a schematic illustration of a wind park having multiple wind turbines and a reactive power compensator, in accordance with the present invention.

Referring to FIG. 4, a number of Wind Turbines 10 are located in a Wind Park 100 having a Substation 110, a Static VAr Compensator 115 for providing reactive power to support grid voltage control. Substation 110 also includes Low Voltage Fault Detector 120, Voltage Sensor 125 and Reactive Power Controller 117. Under normal conditions Reactive Power Controller 117 operates in a commanded reactive power mode whereby reactive power output is responsive to Voltage Sensor 125 and grid voltage conditions around nominal voltage as well as to reactive power (or power factor) commands from a system operator.

A low voltage fault for the present invention is a voltage that falls below about 0.85 per unit and stays below that value for longer than about 40-100 milliseconds. When a fault is detected by Low Voltage Fault Detector 120, a signal is sent to S/H 215 (FIG. 6) and S/H 315 of FIG. 5 to hold both stator current and lambda at their pre-fault values. Likewise Reactive Power Controller 117 switches Static VAr Compensator 115 from a controlled reactive power mode to a constant/controlled current mode.

In a fault condition, both real and reactive currents from Farm 100 are preferably controlled to fixed values. Control System 200 of FIG. 6 controls the real output current to a value established before the fault and Static VAr Compensator 115 controls reactive current to its preset value. Alternatively, Static VAr Compensator 115 controls its output reactive current as a predetermined function of voltage at the PCC.

In the preferred embodiment, Low Voltage Fault Detector 120 operates independently of Low Voltage Fault Detector 265 (see FIG. 6), although if the communication between substation and individual turbine is fast enough, Low Voltage Fault Detector 120 can provide a command via Communication Interface 127 to each Wind Turbine 10 to enter into a low voltage fault mode.

For a particular wind speed, and its associated speed variables, the objective is to operate the turbine rotor at a blade pitch angle that will maximize $c_p$, the fraction of power recovered from the wind. Furthermore for as long as the wind speed is constant and blade pitch angle is unchanged the rotor will remain at the $c_p$ point as long as the power available from the rotor is absorbed by the grid load.

Figure 5:
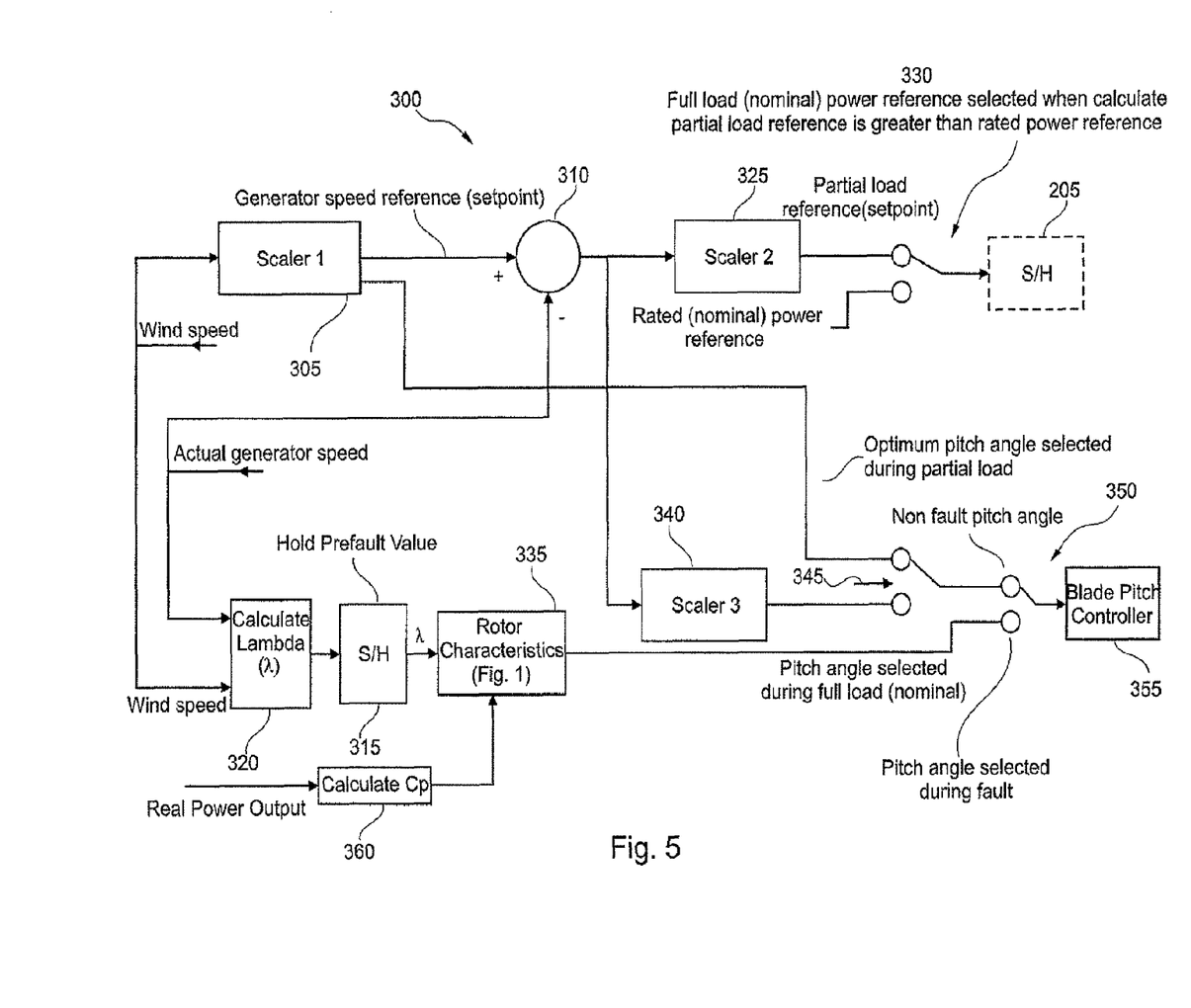
FIG. 5 illustrates a block diagram of the blade pitch angle and power reference generating control systems of the present invention.

Referring to FIG. 5, Rotor Reference Generator Block 300 provides blade pitch angle under partial load, full load as well as high wind speed and fault conditions. Rotor Reference Generator Block 300 receives a wind speed signal, a generator shaft speed signal, output power signal and outputs power level and blade pitch control signals. The generator shaft rotational speed is generally operable associated with the rotor by a gearbox that steps up the rotor rotational speed to that needed by Generator 245. Rotor Reference Generator Block 300 also receives a logic level from Low Voltage Fault Detector 265 of FIG. 6 when a fault occurs and pre-fault values are to be held though, and recovery from, a fault.

Figure 2:
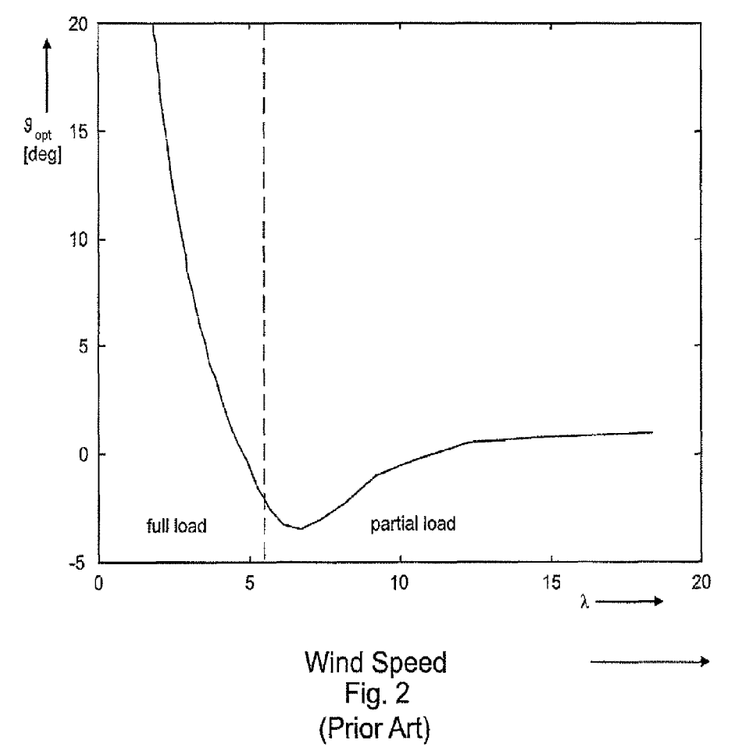
FIG. 2 is a graph illustrating optimum blade pitch angle of a prior art wind turbine as a function of blade tip to wind speed ratio (lambda) and wind speed.

Referring to FIG. 5, a wind speed signal is input to Scaler_1 305 which outputs an optimum generator speed (generator speed reference (setpoint)) for the given input wind speed and blade pitch angle based on the illustrative curve of FIG. 2. This optimum generator speed signal is compared to the actual generator speed in Error Detector 310 and the difference is modified by Scaler_2 325 to represent a partial load reference (set point). This is the power level that the wind turbine would have to provide to keep the actual generator speed equal to the reference generator speed for a particular wind speed. The partial load reference power level is fed to Switch 330 that selects either a partial load reference value or a rated (nominal) power reference level. The value is selected based on whether the calculated value of reference power is greater than the rated power reference. Stated differently, if the power level based on the wind speed is equal to or greater than the rated (nominal) power, then Switch 330 selects the rated power value since the value based on wind speed would exceed turbine ratings. The output of Switch 330 feeds Sample and Hold (S/H) 205 (shown in shadow in this FIG. 5).

Referring again to FIG. 5, the actual generator speed signal along with the wind speed signal also feeds Calculate Lambda Block 320 where a lambda is continuously calculated. The output of Calculate Lambda Block 320 feeds Sample and Hold (S/H) 315 which continuously passes the lambda value until a hold command is received from Low Voltage Fault Detector 265 of FIG. 6

The held pre-fault value of lambda along with a value of $c_p$ calculated in Calculate Block 360 is used with prestored index tables that present the information in FIG. 1. These tables are entered with lambda and calculated $c_p$ to yield a blade pitch angle that will extract from the wind just enough power to provide the output power required by the grid (from Power Sense 275 in FIG. 6) at any particular point in the fault cycle.

The determined blade pitch angle is fed to Switch 350 which selects either pitch angles under fault conditions or under non fault conditions. Likewise the non fault values are selected by Switch 345 which selects between an optimum blade pitch angle (based on wind speed only) during partial load as shown in FIG. 2 or a blade pitch angle during rated load where the load is fixed and the speed of the blade is controlled to below overspeed conditions. The selected angle is fed to Blade Pitch Controller 355.

Figure 6:
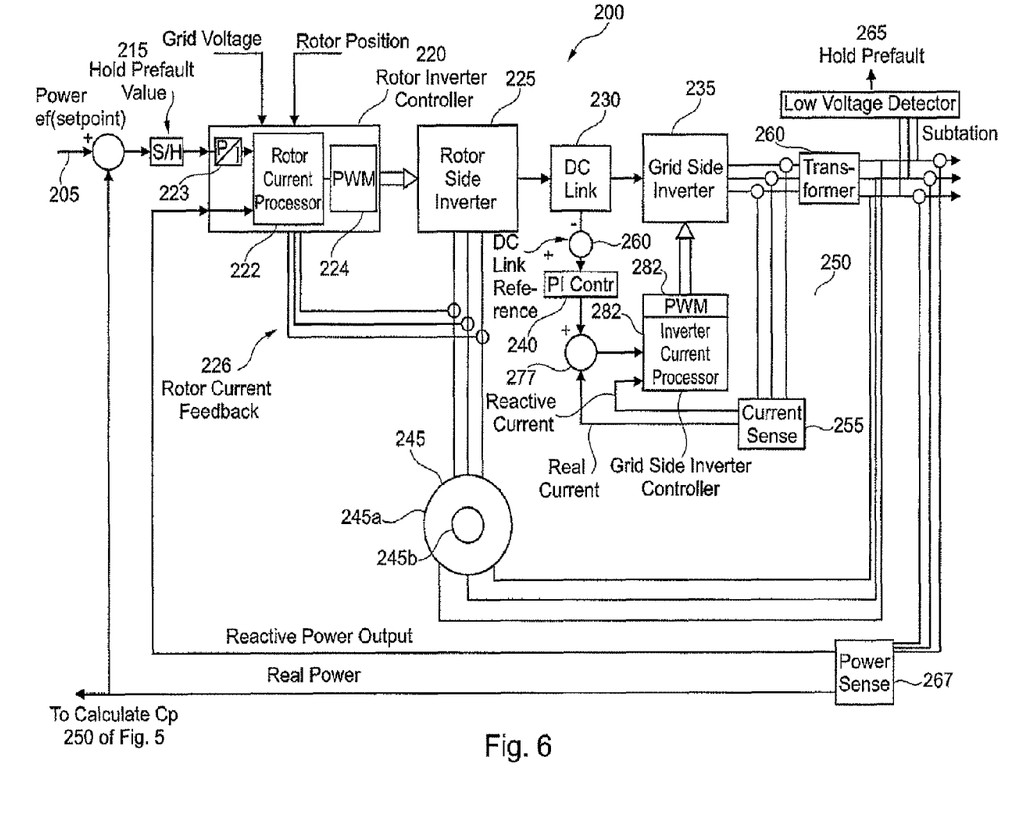
FIG. 6 gives a block diagram that shows the major control systems of the wind turbine of the present invention.

Referring to Control System 200 in FIG. 6, Wind Turbine Rotor 23 (shown in FIG. 3) mechanically drives Generator 245, a DFIG through a gearbox (not shown). The electrical power from Generator 245 is provided to a utility grid from Stator 245a of Generator 245 at all power-producing generator speeds, and also from the Rotor 245b (via a converter) for generator speeds above synchronous speed which is preferable 1800 rpm, with a 4 pole machine for a utility grid frequency of 60 hertz, or 1500 rpm for a utility grid frequency of 50 hertz. Machines with other numbers of poles can used and the synchronous speed will change accordingly.

Control System 200 is configured using scalar control that maintains a Wind Turbine output power that represents power in the wind over a wide speed range up to the point where generator speed would exceed its nominal value which in a preferred embodiment is 1860 RPM. At wind speeds that would drive generator speed above 1860 RPM, the Power Reference is fixed to provide nominal Wind Turbine output power and blade pitch angle is varied to maintain the generator speed at substantially 1860 RPM.

While the present invention uses scalar control for control of Generator 245 and Grid Side Inverter 235 to gain the benefit of controlling individual phase currents, field oriented control may also be used.

Output from Stator 245a and Grid Side Inverter 235 are combined down stream of Transformer 260 shown in FIG. 6. As noted, the use of Static VAr Compensator 115 to provide reactive power needs allows Generator 245 to operate at maximum real power and not be constrained by the effects of rotor or stator heating which may be present when producing or absorbing reactive power. In an alternative embodiment a STATCOM device is used for reactive power support of the park and utility grid.

While real power outputs from Stator 245a and Rotor 245b (via grid Side Inverter 235) are controlled separately, both act as constant or controlled current sources of real current. That is, their output currents are scaled functions of a reference value that is a function of power in the wind and not significantly influenced by the load. Therefore, if for example, Stator 245a of the wind turbine was delivering 1000 amperes AC to the grid before a fault, 1000 amperes would be delivered to the grid during the fault even though the grid voltage was changing. Likewise if wind conditions were such that an output current before the fault was 500 amperes then 500 amperes would be delivered by Stator 245 during the fault.

Both the Stator 245a and Grid Side Inverter 235 act as constant or controlled current sources of real current by virtue of current feedback, as will be apparent to one skilled in the art from the discussion of the configuration of Control System 200 given below.

The Power Reference (set point) from Switch 330 is the reference input to Control System 200 and defines the real power to be outputted from Control System 200. No reactive power input commands are present in a preferred embodiment of Control System 200 since all reactive power for or from Wind Farm 100 comes from Static VAr Compensator 115 of FIG. 4 or other non Wind Turbine sources.

The power reference signal is fed to Sample and Hold (S/H) 215 where it either passes the signal through unchanged, or under command from Low Voltage Fault Detector 265, holds its output fixed so that the last value before the fault is outputted during a fault interval. The output of S/H 215 is fed to Power to Current Converter (P/I) 223 in Rotor Inverter Controller 220 and then to Rotor Current Processor 222 where it is used to form a magnitude of the three rotor currents. In alternate embodiments only two of the three rotor currents are used since, in a three phase system without neutral, the third line current and hence the third rotor current is readily derived from the other two.

Feed back control of rotor currents is accomplished by comparing desired rotor currents (rotor current references) to actual rotor currents. In the present invention AC rotor current references are formed with each having a magnitude equal to the value established from Power to Current Converter (P/I) 223 and at an angle that represents a current waveform that rotates in space at a speed of the rotor plus slip speed and a fixed offset angle relative to grid voltage. This latter angle represents a power factor angle which in the preferred embodiment will be zero.

The rotor current references are compared with the fed back rotor current samples and any difference is fed to PWM 224. The output of PWM 224 is fed to Rotor Side Inverter 225 where actual rotor currents are formed and fed to Rotor 245b. The net effect of the control just described is that rotor currents will have a magnitude that is substantially proportional to power in the wind and substantially independent of rotor characteristics. Moreover since the windings of Stator 245a for DFIG 245 "look like" the secondary of a transformer having Rotor 245b as its primary, the output of Stator 245a will "look like" a controlled current source and the output power from Stator 245a will be the controlled current value times a varying voltage value and have a substantially zero reactive power component.

In an alternate embodiment, the second input to Rotor Inverter 225 is derived from an error detector (similar to Error Detector 215) that compares a desired and actual reactive power output and feeds the difference to Rotor Inverter Controller 220 where the resulting error is amplified and converted to signals controlling the Rotor Side Inverter 225. In this manner, both real and reactive power can be controlled during normal operation, but the reactive power reference can be set to zero or some other value during low voltage fault conditions.

When Generator 245 is rotating above synchronous speed, variable frequency power is available from Rotor 245b of Generator 245, rectified in Rotor Side Inverter 225 and charges capacitors in DC Link 230 where ripple is reduced and energy is available for short term transients. Power available from Rotor 245b is transferred to the output of the Grid Side Inverter 235 through the operation of a feedback control systems that adjusts the load on the capacitance at DC Link 230 control system that keeps the DC voltage at DC Link 230 at a fixed value. That is, any tendency for DC link Voltage to increase above a preferred value of 860 volts is counteracted by an increasing load current from the capacitance.

The voltage at the capacitance of DC Link 230 is compared to the DC Link Reference at Error Detector 240 and the output becomes the reference input to Error Detector 277. This latter signal represents the desired current to hold the DC Voltage at the capacitance of the DC link at its preferred fixed value. In a manner similar to that used to control rotor currents of Generator 245, the reference value based on the error from Error Detector 277 becomes the amplitude of three current reference waveforms that rotate at the grid frequency and are compared with the current feedback values from Current Sense 255 to form a controlled current value with no reactive power component.

Importantly even if the Rotor Side Inverter 225 and associated feedback were to lose control for a short period due to demagnetization, the Grid Side Inverter would continue to operate. In addition, the rising voltage on DC link 230 due to high rotor voltages would be counteracted by an increasing load current commanded by Error Detector 260. By its operation in the present invention, Grid Side Inverter 235 reduces requirements for power dissipating elements to deal with high DC Link voltages due to a sever fault. When rotor voltages exceed safe limits, Over Voltage Protection (OVP) 229 in FIG. 6 operates to limit rotor voltage rise and or prevent excessive rotor currents from passing through Rotor Side Inverter 225.

A preferred embodiment of the present invention also includes a UPS (not shown) to ensure that circuits that rely on the utility grid or stator for operating power have sufficient power to operate during a fault.

As one skilled in the art would recognize, the present invention is applicable to wind turbine systems having generators followed by full converters where all power to the grid passes through the full converter, wind turbine systems having partial converters where power to a grid can be taken from a stator and a rotor, and wind turbines that do not include a grid side inverter for supplying electricity to a grid.

Although the invention has been described by reference to certain embodiments and prior art wind turbines, the invention is not limited to the embodiments described. Modifications and variations will occur to those skilled in the art in light of the teachings. The scope of the invention is defined with reference to the following claims.

The invention claimed is:

1. A wind turbine for providing electrical power to a grid under low output voltage and variable power conditions, said wind turbine comprising an AC generator having a stator and a rotor with variable pitch blades operationally connected thereto, said wind turbine comprising;

an output power sensor;
an output current sensor;
a first sample and hold for holding a first value established before the low output voltage condition;
a second sample and hold for holding a second value established before the low output voltage condition;
a rotor inverter controller comprising:
    a power to current converter for receiving the value from the first sample and hold and generating a current reference signal,
    an error detector for generating signals dependent on an error between the current reference signal and an output current signal from the current sensor,
    a PWM coupled to the error detector for generating rotor drive currents to establish stator output current values dependent on the reference current signal; and
    blade pitch controller for receiving the value from the second sample and hold and a signal from the output power sensor and adjusting the pitch of the variable pitch blades dependent upon the output power signal during low voltage condition and the value from the second sample and hold.

2. A method for controlling a wind turbine system during a low voltage condition, said method comprising the steps of:
measuring output power;
measuring output current;
storing a power system parameter value established before the low voltage condition;
storing a rotor system parameter value established before the low voltage condition;
comparing the power system parameter value to a parameter value dependent on the measured output current and controlling output current to be substantially dependent on the stored power system parameter value; and
receiving a value dependent on the output power and controlling blade pitch to maintain the value of the stored rotor system parameter value at substantially the same value during a low voltage condition as it was before the low voltage condition.

\* \* \* \* \*

UNITED STATES PATENT AND TRADEMARK OFFICE
CERTIFICATE OF CORRECTION

| | | |
|---|---|---|
| PATENT NO. | : 7,966,103 B2 | Page 1 of 1 |
| APPLICATION NO. | : 12/809379 | |
| DATED | : June 21, 2011 | |
| INVENTOR(S) | : Allan H. Jorgensen | |

It is certified that error appears in the above-identified patent and that said Letters Patent is hereby corrected as shown below:

In the Specification:

At column 2, line number 59, change "requires" to --require--.

At column 6, line number 35, change "though" to --through--.

At column 7, line number 6, change two occurrences of "non fault" to --nonfault-- and at line number 22, after "can", insert --be--.

At column 8, line number 55, before "feedback" delete "a".

In the Claims:

At column 9, claim number 1, line number 41, change ";" to --:--.

Signed and Sealed this
Sixteenth Day of August, 2011

David J. Kappos
*Director of the United States Patent and Trademark Office*